United States Patent
Rekhviashvili

(10) Patent No.: US 10,532,756 B1
(45) Date of Patent: Jan. 14, 2020

(54) COLLAPSIBLE CART ASSEMBLY

(71) Applicant: Vasil Rekhviashvili, Sunnyside, NY (US)

(72) Inventor: Vasil Rekhviashvili, Sunnyside, NY (US)

( * ) Notice: Subject to any disclaimer, the term of this patent is extended or adjusted under 35 U.S.C. 154(b) by 0 days.

(21) Appl. No.: 16/150,612

(22) Filed: Oct. 3, 2018

(51) Int. Cl.
| B62B 3/00 | (2006.01) |
| B62B 3/02 | (2006.01) |
| B62B 3/10 | (2006.01) |
| B62B 5/06 | (2006.01) |

(52) U.S. Cl.
CPC .............. B62B 3/022 (2013.01); B62B 3/10 (2013.01); B62B 5/06 (2013.01); B62B 2205/32 (2013.01); B62B 2301/04 (2013.01)

(58) Field of Classification Search
CPC ....... B62B 3/00; B62B 3/022; B62B 2205/32; B62B 2205/33
USPC .................................................... 280/33.998
See application file for complete search history.

(56) References Cited

U.S. PATENT DOCUMENTS

| 3,782,746 A | * | 1/1974 | Isaacs | ..................... B62B 3/002 |
| | | | | 280/33.996 |
| D252,197 S | | 6/1979 | Gale | |
| 4,644,876 A | * | 2/1987 | Thomas | .................. A47B 13/06 |
| | | | | 108/154 |
| 5,299,816 A | * | 4/1994 | Vom Braucke | ....... B62B 3/1476 |
| | | | | 280/33.998 |
| 6,860,494 B1 | | 3/2005 | Chisholm | |
| 7,182,350 B1 | * | 2/2007 | Liao | ....................... B62B 3/008 |
| | | | | 280/33.991 |
| 7,213,829 B2 | | 5/2007 | Wu | |
| 7,971,898 B2 | | 7/2011 | Wise | |
| 8,342,544 B1 | * | 1/2013 | Blewett | .................. B62B 3/022 |
| | | | | 211/189 |
| 8,505,960 B1 | | 8/2013 | Shindelar | |
| 8,662,506 B2 | | 3/2014 | Bengtzen | |
| 8,678,527 B2 | | 3/2014 | Healy | |
| 9,144,305 B1 | * | 9/2015 | Collins, Jr. | ............ A47B 71/00 |
| 2009/0145338 A1 | | 6/2009 | Panosian | |
| 2014/0338574 A1 | * | 11/2014 | Wen | ....................... A47B 31/04 |
| | | | | 108/177 |
| 2016/0332292 A1 | | 11/2016 | Cheff | |

* cited by examiner

Primary Examiner — Brian L Swenson

(57) ABSTRACT

A collapsible cart assembly for storing and transporting a plurality of objects on a jobsite includes a box for containing objects on a jobsite. A plurality of wheels is each rotatably coupled to the box to roll along a support surface. A plurality of shelving units is provided and each of the shelving units is telescopically coupled to the box. Each of the shelving units selectively support objects for storage and for transportation. Moreover, each of the shelving units is positionable in a deployed position having the shelving units being distributed upwardly from the box and being spaced apart from each other. Each of the shelving units is positionable in a collapsed position having the shelving units being stacked on the box.

9 Claims, 5 Drawing Sheets

COLLAPSIBLE CART ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cart devices and more particularly pertains to a new cart device for storing and transporting a plurality of objects on a jobsite.

BRIEF SUMMARY OF THE INVENTION

An embodiment of the disclosure meets the needs presented above by generally comprising a box for containing objects on a jobsite. A plurality of wheels is each rotatably coupled to the box to roll along a support surface. A plurality of shelving units is provided and each of the shelving units is telescopically coupled to the box. Each of the shelving units selectively support objects for storage and for transportation. Moreover, each of the shelving units is positionable in a deployed position having the shelving units being distributed upwardly from the box and being spaced apart from each other. Each of the shelving units is positionable in a collapsed position having the shelving units being stacked on the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
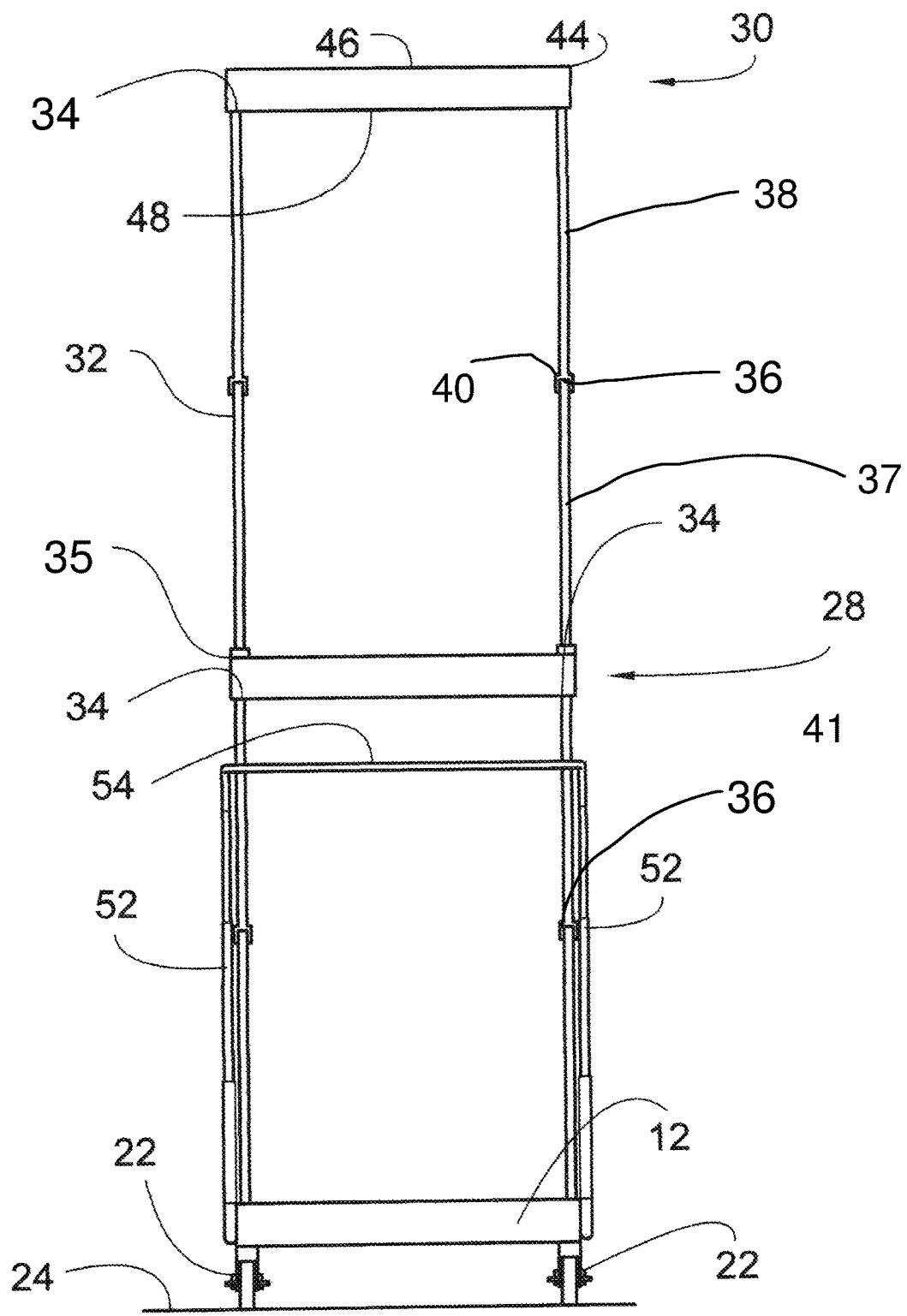
FIG. 1 is a back view of a collapsible cart assembly according to an embodiment of the disclosure.
Figure 2:
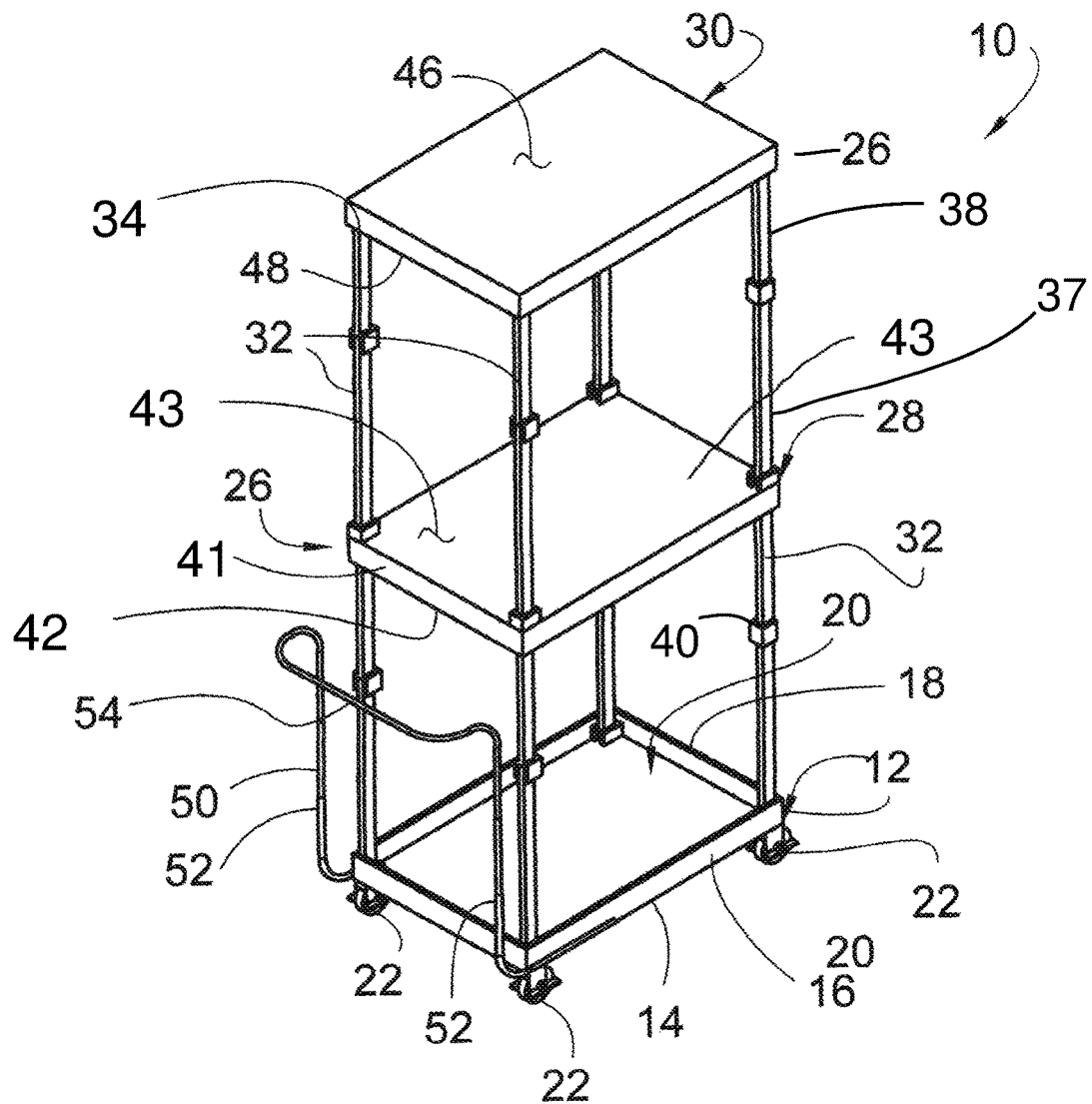
FIG. 2 is a top perspective view of an embodiment of the disclosure.
Figure 3:
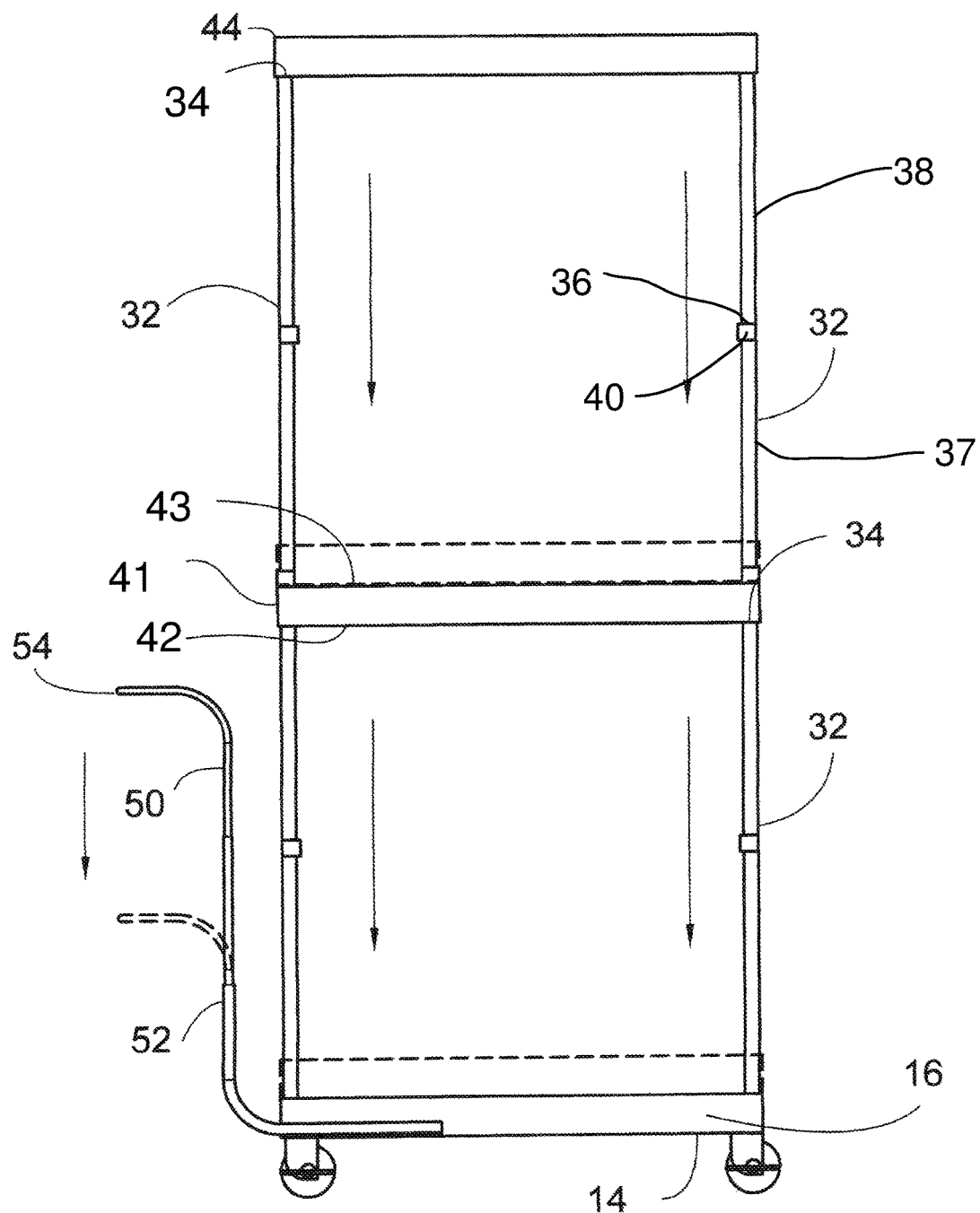
FIG. 3 is a right side view of an embodiment of the disclosure.
Figure 4:
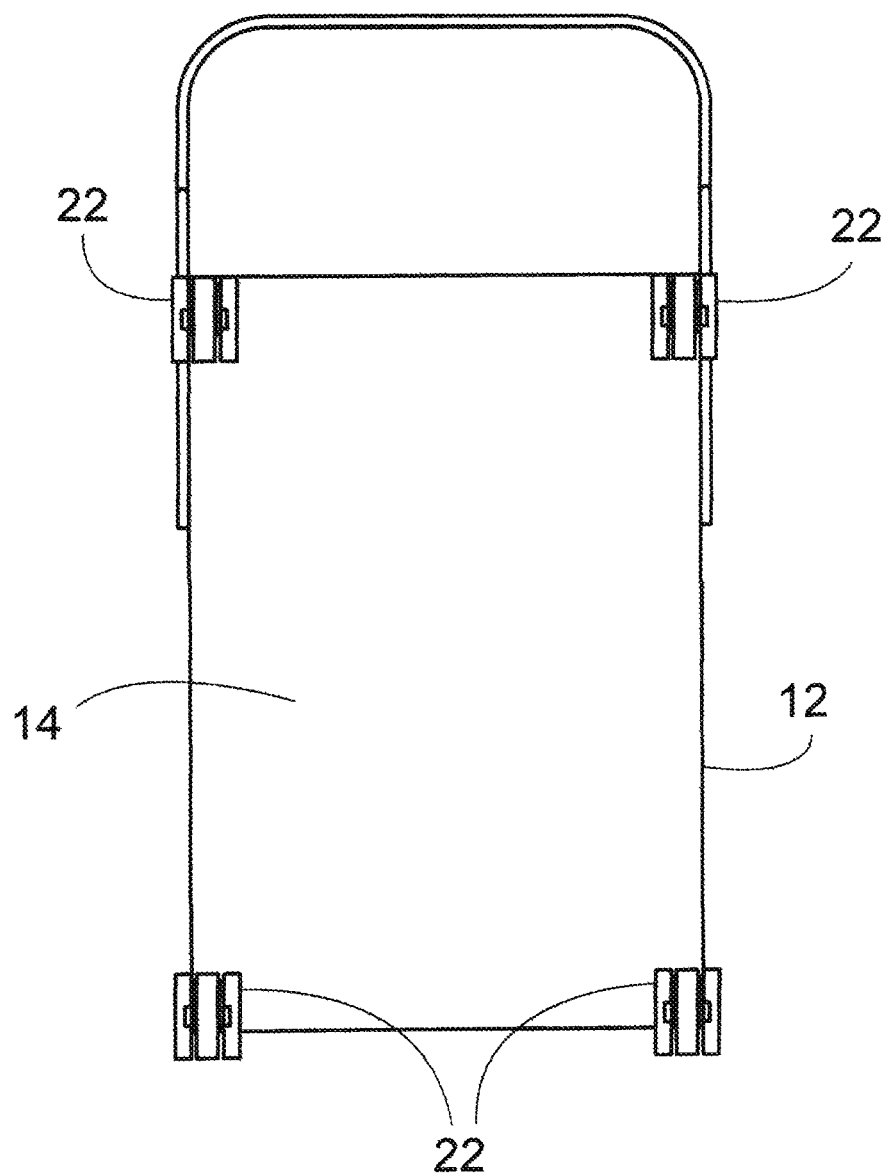
FIG. 4 is a bottom view of an embodiment of the disclosure.
Figure 5:
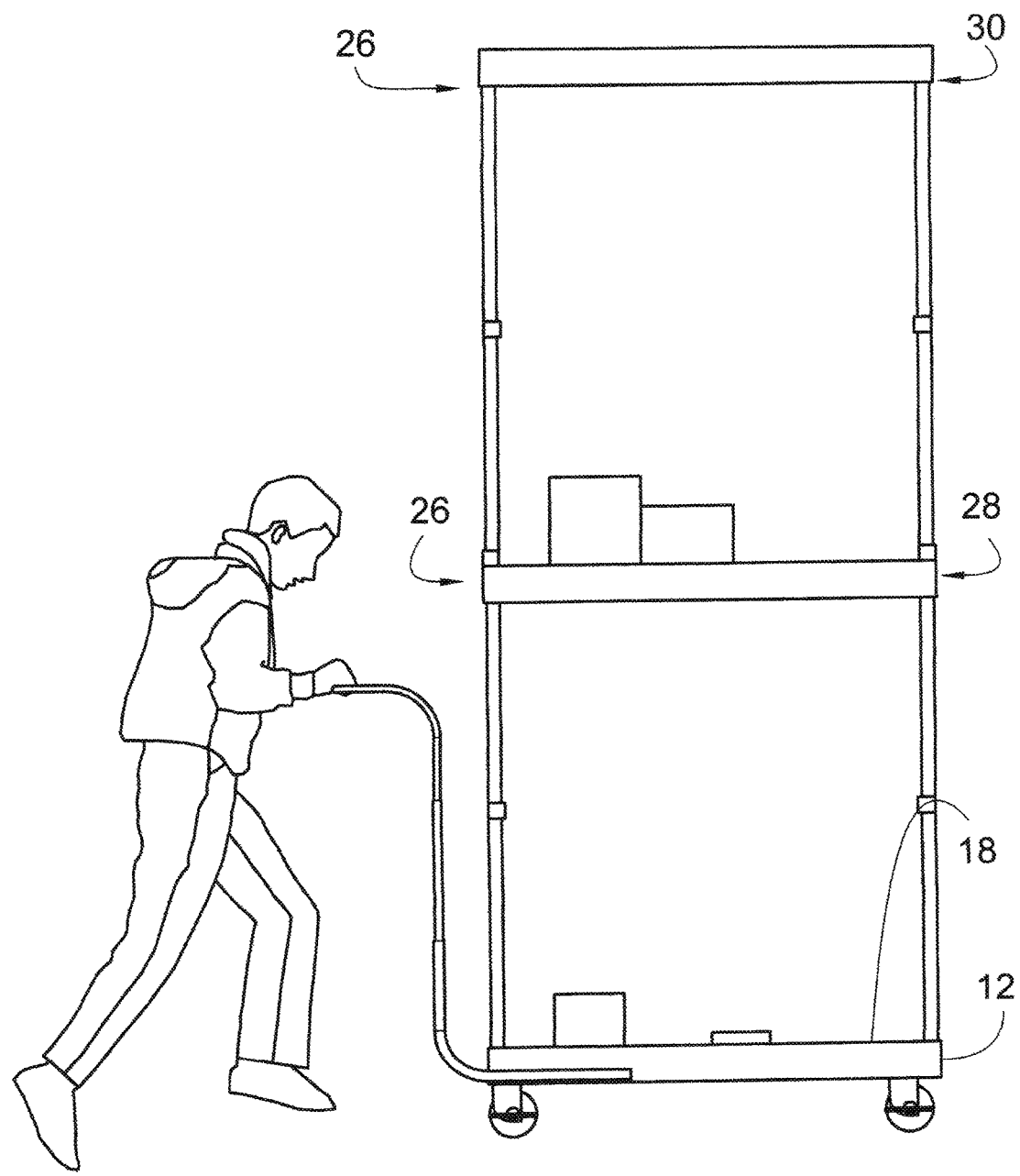
FIG. 5 is a perspective in-use view of an embodiment of the disclosure.

With reference now to the drawings, and in particular to FIGS. 1 through 5 thereof, a new cart device embodying the principles and concepts of an embodiment of the disclosure and generally designated by the reference numeral 10 will be described.

As best illustrated in FIGS. 1 through 5, the collapsible cart assembly 10 generally comprises a box 12 for carrying objects. The objects may be power tools, pieces of lumber and other objects commonly associated with construction work, industrial work and any other jobsite. The box 12 has a bottom wall 14 and an outer wall 16 extending upwardly therefrom and the outer wall 16 has a distal edge 18 with respect to the bottom wall 14 defining an opening 20 into the box 12. The box 12 is comprised of a rigid material and the box 12 may have a weight capacity of approximately 135.0 kg.

A plurality of wheels 22 is provided and each of the wheels 22 is rotatably coupled to the box 12 for rolling along a support surface 24. The support surface 24 may be ground, a floor and any other horizontal support surface 24. Each of the wheels 22 is positioned on the bottom wall 14 and each of the wheels 22 is aligned with one of four corners of the box 12. Moreover, each of the wheels 22 may comprise a locking caster or the like for selectively inhibiting the wheels 22 from rolling.

A plurality of shelving units 26 is provided and each of the shelving units 26 is movably coupled to the box 12 for supporting objects. Each of the shelving units 26 is positionable in a deployed position having the shelving units 26 being distributed upwardly from the box 12 and being spaced a selected distance apart from each other. In this way objects may be placed on each of the shelving units 26 for storage or for transportation. Each of the shelving units 26 is positionable in a collapsed position having the shelving units 26 being stacked on the box 12. Thus, the height of the shelving units 26 is reduced when objects are not being stored or transported on the shelving units 26. The plurality of shelving units 26 includes a first shelving unit 28 and a second shelving unit 30, and each of the first shelving unit 28 and the second shelving unit 30 includes a plurality of legs 32.

Each of the legs 32 has a first end 34 and a second end 35, and each of the legs 32 has a break 36 therein to define a lower half 37 that is pivotally coupled to an upper half 38. Additionally, the upper half 38 of each of the legs 32 includes a lock 40 that releasably engages the lower half 37 of the legs 32. The upper half 38 of the legs 32 is oriented collinear with the lower half 37 of the legs 32 when the legs 32 are positioned in an unfolded position. Alternatively, the upper half 38 of the legs 32 lie on the lower half 37 of the legs 32 when the legs 32 are positioned in a folded position. The first end 34 of each of the legs 32 corresponding to the first shelving unit 28 is coupled to bottom wall of the box 12. Each of the legs 32 corresponding to the first shelving unit 28 are aligned with one of the four corners of the box 12.

The first shelving unit 28 includes a first shelf 41 that has a bottom surface 42 and a top surface 43. The bottom surface 42 of the first shelf 41 is coupled to the second end 35 of each of the legs 32 of the first shelving unit 28. Thus, the first shelf 41 is spaced upwardly from the box 12 when the legs 32 of the first shelving unit 28 are positioned in the unfolded position. The first shelf 41 rests on the box 12 when the legs 32 of the first shelving unit 28 are positioned in the folded position. The first end 34 of each of the legs 32 of the second shelving unit 30 is coupled to the top surface 43 of the first shelf 41 and each of the legs 32 corresponding to the second shelving unit 30 is aligned with a respective one of the legs 32 corresponding to the first shelving unit 28.

The second shelving unit 30 includes a second shelf 44 that has an upper surface 46 and a lower surface 48. The second end 35 of each of the legs 32 of the second shelving unit 30 is coupled to the lower surface 48. Thus, the second shelf 44 is spaced from the first shelf 41 when the legs 32 of the second shelving unit 30 are positioned in the unfolded position. The second shelf 44 lies on the first shelf 41 when the legs 32 of the second shelving unit 30 are positioned in the folded position.

A handle 50 is coupled to the box 12 for rolling the box 12 along the support surface 24. The handle 50 has a pair of upright portions 52 and each of the upright portions 52 extends upwardly along the box 12. Each of the upright portions 52 is telescopic such that the handle 50 has an adjustable height. The handle 50 has a central portion 54 extending between the upright portions 52 and the central portion 54 is spaced laterally away from the box 12. Additionally, the central portion 54 is horizontally oriented thereby facilitating the central portion 54 to be gripped for pushing the box 12.

In use, the shelving units 26 are urged into the deployed position to place and remove objects in the box 12. The handle 50 is gripped to roll the box 12 along the support surface 24 for transporting the objects. Additionally, objects may be stored on top of each of the first shelf 36 and the second shelf 44 when the shelving units 26 are in the deployed position. Moreover, the objects on the second shelf 44 are accessible to the user when the user is on the ladder and when the shelving units 26 are in the deployed position. The box 12 and the shelving units 26 may be left stationary to serve as a shelving unit when the shelving units 26 are in the deployed position. The shelving units 26 may be positioned in the stored position thereby facilitating the second shelf 44 to serve as a work table. Moreover, the first shelving unit 28 and the second shelving unit 30 may each be positioned in the deployed position independently of one another.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A collapsible cart assembly having a plurality of adjustable shelves wherein said assembly is configured to carry a variety of objects, said assembly comprising:
    a box being configured to have objects positioned therein;
    a plurality of wheels, each of said wheels being rotatably coupled to said box wherein each of said wheels is configured to roll along the support surface;
    a plurality of shelving units, each of said shelving units being adjustably coupled to said box wherein each of said shelving units is configured to selectively support objects, each of said shelving units being positionable in a deployed position having said shelving units being distributed upwardly from said box and being spaced apart from each other, said shelving units having a maximum height ranging between approximately 5.0 feet and 6.0 feet when said shelving units are positioned in said deployed position, each of said shelving units being positionable in a collapsed position having said shelving units being stacked on said box, said plurality of shelving units including a first shelving unit and a second shelving unit, each of said first shelving unit and said second shelving unit including a plurality of legs, each of said legs having a first end and a second end, each of said legs having a break therein to define a lower half being pivotally coupled to an upper half, said upper half of said legs being oriented collinear with said lower half of said legs when said legs are positioned in an unfolded position, said upper half of said legs lying on said lower half of said legs when said legs are positioned in a folded position; and
    a handle being coupled to said box for rolling said box along the support surface.

2. The assembly according to claim 1, wherein:
    said box has a bottom wall and an outer wall extending upwardly therefrom, said outer wall having a distal edge with respect to said bottom wall defining an opening into said box; and
    each of said wheels is positioned on said bottom wall, each of said wheels being aligned with one of four corners of said box.

3. The assembly according to claim 1, wherein said first end of each of said legs of said first shelving unit being coupled to bottom wall of said box, each of said legs of said first shelving unit being aligned with one of said four corners of said box.

4. The assembly according to claim 3, wherein said first shelving unit includes a first shelf having a bottom surface and a top surface, said bottom surface of said first shelf being coupled to said second end of each of said legs of said first shelving unit, said first shelf being spaced upwardly from said box when said legs of said first shelving unit are positioned in said unfolded position, said first shelf resting on said box when said legs of said first shelving unit are positioned in said folded position.

5. The assembly according to claim 4, wherein said first end of each of said legs of said second shelving unit is coupled to said top surface of said first shelf, each of said legs corresponding to said second shelving unit being aligned with one of said legs corresponding to said first shelving unit.

6. The assembly according to claim 5, wherein said second shelving unit includes a second shelf having an upper surface and a lower surface, said second end of each of said legs of said second shelving unit being coupled to said lower surface, said second shelf being spaced from said first shelf when said legs of said second shelving unit are positioned in said unfolded position, said second shelf lying on said first shelf when said legs of said second shelving unit are positioned in said folded position.

7. The assembly according to claim 1, wherein said handle has a pair of upright portions, each of said upright portions extending upwardly along said box.

8. The assembly according to claim 7, wherein said handle has a central portion extending between said upright portions, said central portion being horizontally oriented wherein said central portion is configured to be gripped.

9. A collapsible cart assembly having a plurality of adjustable shelves wherein said assembly is configured to carry a variety of objects, said assembly comprising:
    a box being configured to have objects positioned therein, said box having a bottom wall and an outer wall extending upwardly therefrom, said outer wall having a distal edge with respect to said bottom wall defining an opening into said box;
    a plurality of wheels, each of said wheels being rotatably coupled to said box wherein each of said wheels is configured to roll along the support surface, each of said wheels being positioned on said bottom wall, each of said wheels being aligned with one of four corners of said box;
    a plurality of shelving units, each of said shelving units being telescopically coupled to said box wherein each of said shelving units is configured to selectively support objects, each of said shelving units being positionable in a deployed position having said shelving units being distributed upwardly from said box and being spaced apart from each other, each of said shelving units being positionable in a collapsed position having said shelving units being stacked on said box, said plurality of shelving units including a first shelving unit and a second shelving unit, each of said first shelving unit and said second shelving unit comprising:
        a plurality of legs, each of said legs having a first end and a second end, each of said legs having a break therein to define a lower half being pivotally coupled to an upper half, said upper half of said legs being oriented collinear with said lower half of said legs when said legs are positioned in an unfolded position, said upper half of said legs lying on said lower half of said legs when said legs are positioned in a folded position, said first end of each of said legs corresponding to said first shelving unit being coupled to bottom wall of said box, each of said legs corresponding to said first shelving unit being aligned with one of said four corners of said box;
        a first shelf having a bottom surface and a top surface, said bottom surface of said first shelf being coupled to said second end of each of said legs of said first shelving unit, said first shelf being spaced upwardly from said box when said legs of said first shelving unit are positioned in said unfolded position, said first shelf resting on said box when said legs of said first shelving unit are positioned in said folded position, said first end of each of said legs of said second shelving unit being coupled to said top surface of said first shelf, each of said legs corresponding to said second shelving unit being aligned with one of said legs corresponding to said first shelving unit; and
        a second shelf having an upper surface and a lower surface, said second end of each of said legs of said second shelving unit being coupled to said lower surface, said second shelf being spaced from said first shelf when said legs of said second shelving unit are positioned in said unfolded position, said second shelf lying on said first shelf when said legs of said second shelving unit are positioned in said folded position; and
    a handle being coupled to said box for rolling said box along the support surface, said handle having a pair of upright portions, each of said upright portions extending upwardly along said box, said handle having a central portion extending between said upright portions, said central portion being horizontally oriented wherein said central portion is configured to be gripped.

\* \* \* \* \*